United States Patent [19]
Carney et al.

[11] Patent Number: 4,794,805
[45] Date of Patent: Jan. 3, 1989

[54] TENNIS RACKET STRING TENSION TESTER

[76] Inventors: William P. Carney; Donald P. Carney, both of 4 High Ridge Rd., Oyster Bay, N.Y. 11771

[21] Appl. No.: 45,574

[22] Filed: May 4, 1987

[51] Int. Cl.⁴ .......................... G01L 5/06; G01L 5/10
[52] U.S. Cl. ............................... 73/862.47; 73/862.48
[58] Field of Search ............ 73/862.45, 862.47, 862.48

[56] References Cited

U.S. PATENT DOCUMENTS

| | | |
|---|---|---|
| 4,055,999 | 11/1977 | Cope . |
| 4,077,256 | 3/1978 | Hollander . |
| 4,103,546 | 8/1978 | Hickey et al. . |
| 4,116,054 | 9/1978 | Howe . |
| 4,488,444 | 12/1984 | Weidmann et al. . |
| 4,590,808 | 5/1986 | Lightfoot et al. ................ 73/862.48 |

FOREIGN PATENT DOCUMENTS 652262 12/1964 Belgium .
928178 5/1947 France .

Primary Examiner—Charles A. Ruehl
Attorney, Agent, or Firm—Charles E. Temko

[57] ABSTRACT

A device for testing string tension in the stringing of a tennis racket of simplified construction as compared to prior art devices. The device comprises only five component parts, and occupies a minimum amount of storage space when not in use. Provision is made in several embodiments for including in measurement that component of tension which is caused by slight flexing of the tennis racket frame, and components of frictional force caused by engagement of the device with the tennis racket are completeley eliminated.

7 Claims, 3 Drawing Sheets

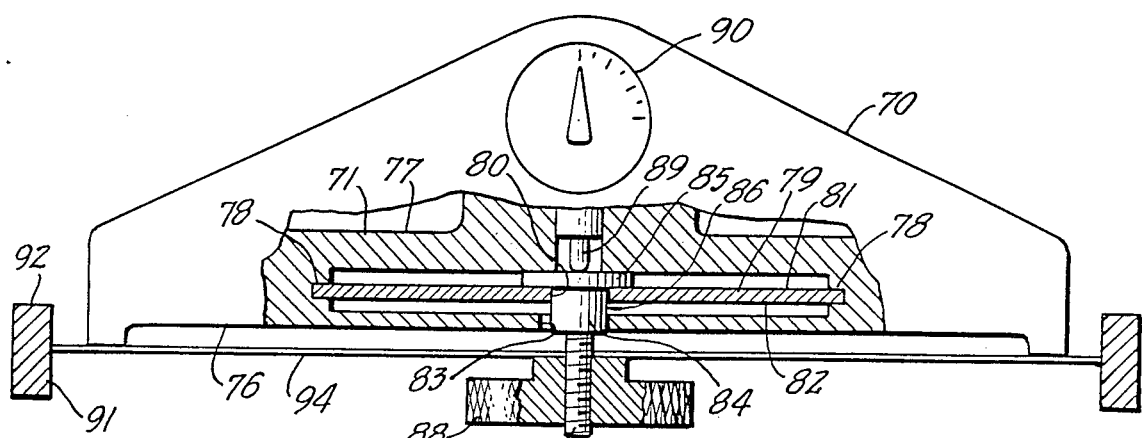
FIG. 4.
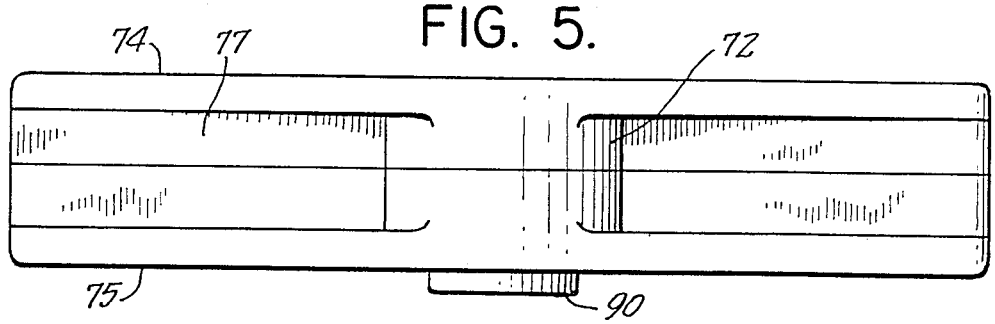
FIG. 5.
FIG. 6.
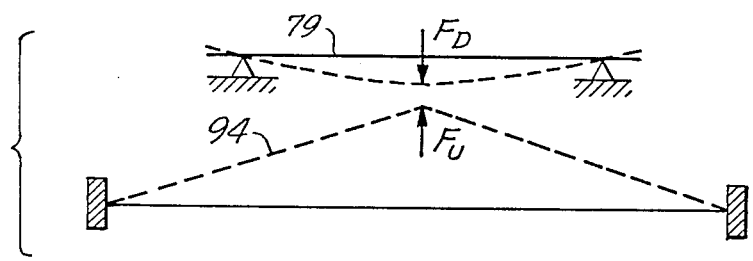
FIG. 7.
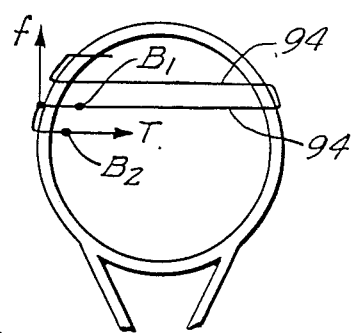
FIG. 8.
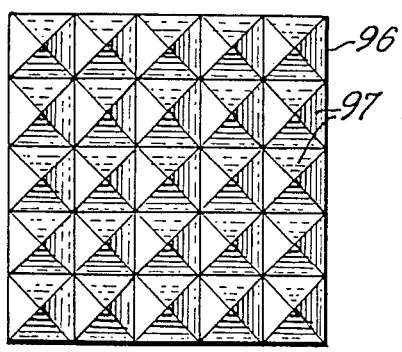
FIG. 10.
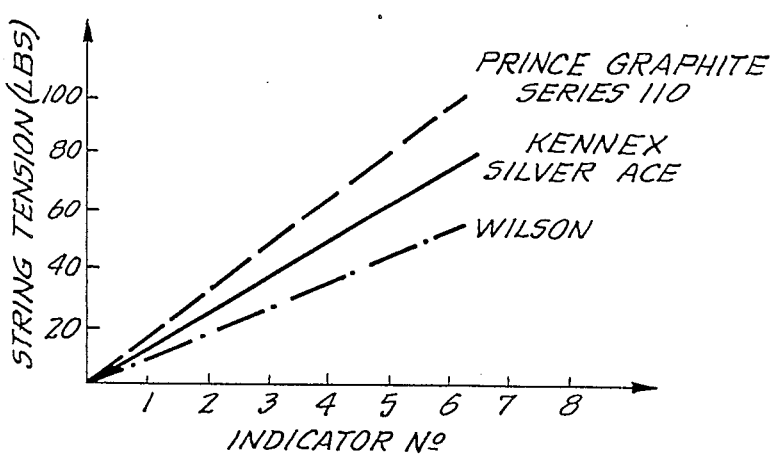
FIG. 9.

TENNIS RACKET STRING TENSION TESTER

BACKGROUND OF THE INVENTION

This invention relates generally to the field of tennis racket string tension testing devices, and more particularly to an improved simplified form which can be fabricated at reasonably low cost which can be used on any shape or size racket head design, and which requires a minimum amount of storage space when not in use.

The importance of determination of string tension in the stringing of a tennis racket has been long recognized by tennis players. Many experienced players have several rackets, the strings of which develop different tensions which are used selectively depending upon conditions of play. Often a particular racket having initially a satisfactory degree of tension gradually deteriorates requiring restringing. Without a convenient means of measurement, changes in tension are sensed by the player with continued usage of the racket. However, because of a substantial degree of subjectivity involved, recognition of change in tension by the player is often made long after the need for correction has arisen.

It is known in the art to provide testing devices for measuring string tension in tennis rackets. The bulk of these devices, while not without substantial utility, do suffer from serious disadvantages, the principal ones being high cost of fabrication, unnecessary mechanical complication, substantial bulk and weight, inaccuracy, lack of measurement repeatability, not usable on a variety of racket head designs, and difficulty in use for those possessing only ordinary skills.

SUMMARY OF THE INVENTION

Briefly stated, the invention contemplates the provision of an improved device of the class described in which the above-mentioned disadvantages have been substantially eliminated. The disclosed embodiments comprise only five readily manufactured component parts which can be conveniently assembled without special tools or skills, each of which may be replaced if necessary, without difficulty. A main frame element may be conveniently formed as an aluminum casting or plastic molding, a plunger element and thumb-nut formed as screw machine products, a spring element, and a known displacement gauge modified and calibrated for the purpose of indicating string tension.

BRIEF DESCRIPTION OF THE DRAWING

In the drawing, to which reference will be made in the specification, similar reference characters have been employed to designate corresponding parts throughout the several views.

FIG. 4 is a side elevational view, partly in section, and partly broken away to show detail of a second embodiment of the invention.

FIG. 5 is a top plan view of the second embodiment.

FIG. 6 is a schematic view showing the balancing of forces encountered during the operation of the first and second embodiments.

FIG. 7 is a schematic view showing frictional forces involved in measuring the tension of racket strings.

FIG. 8 is a top plan view of a device for stabilizing the strings of a tennis racket prior to the measuring of the tension thereof.

FIG. 9 is a side elevational view thereof as seen from the lower portion of FIG. 8.

FIG. 10 is a graph plotting string tension against indicated value of a tension indicator device.

DESCRIPTION OF THE DISCLOSED EMBODIMENT

Figure 1:
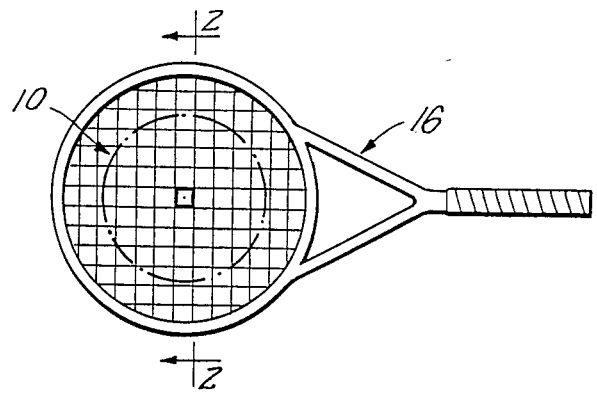
FIG. 1 is a schematic bottom plan view showing a first embodiment of the invention.

In accordance with the invention, the device, generally indicated by reference character 10, comprises broadly: a main frame element 11, a tension indicator element 12, a compression spring 13, a threaded plunger element 14, and a thumb wheel element 15. Reference character 16 designates a conventional tennis racket head. Reference character 17 designates the plane of strings tensioned on the head 16.

The main frame element 11 is preferably formed of an aluminum casting or plastic molding. It includes a main transversely extending wall 21 bounded by an outer surface 22 and an inner surface 23. Inner surface 23 describes a cylinder whose typical cross sections 24 and 25 contact the racket strings on a circular engaging surface typified by contact points 26 and 27. Extending from the outer surface 22 is a circular recess 28 adapted to contain the element 12. The recess 28 extends to a centrally disposed bore 29. At an opposite end of the bore 29 is a first counterbore 30 leading to a circular shoulder 31 formed by a second counterbore 32. Overlying the counterbore 32 is a spring retaining plate 33 secured by screw means 34 and having a centrally disposed orifice 35 extending therethrough.

The dial indicator element 12 may be a modification of a known displacement gauge used in machine shops and laboratories for determining, very accurately, depth measurements. Other types of known gauges (not shown) may also be used with equal facility. The element 12 includes a housing 40 adapted to be positioned in the recess 28 having a transparent cover 41 overlying a suitable dial (not shown). Extending inwardly from the housing is a threaded hollow sleeve 43 engaged by a retaining nut 44 in the first counterbore 30. A sliding piston 45 extends through the sleeve 43 and has an outer end surface 46 contacting the plunger element 14.

The plunger element 14 is preferably formed as a screw machine product, and includes a cylindrical body 50, an outer end 51 of which forms a circular flange 52 which abuts the shoulder 31. An outer surface 53 is provided with a centrally disposed bore 54 which accommodates the piston 45. An oppositely disposed end is bounded by a transversely extending surface 55 from which a threaded shank 56 extends.

The thumb wheel element 15 may also be formed as a screw machine product, and includes an inner surface 60, an outer surface 61 and a knurled peripheral surface 62. A centrally disposed threaded bore 63 selectively engages the shank 56.

Figure 2:
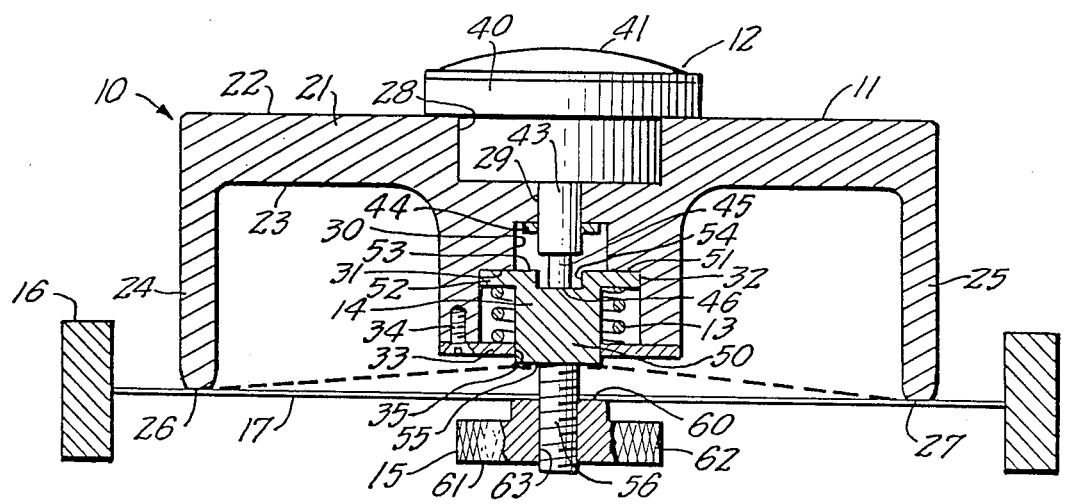
FIG. 2 is a transverse sectional view thereof as seen from the plane 2—2 in FIG. 1.
Figure 3:
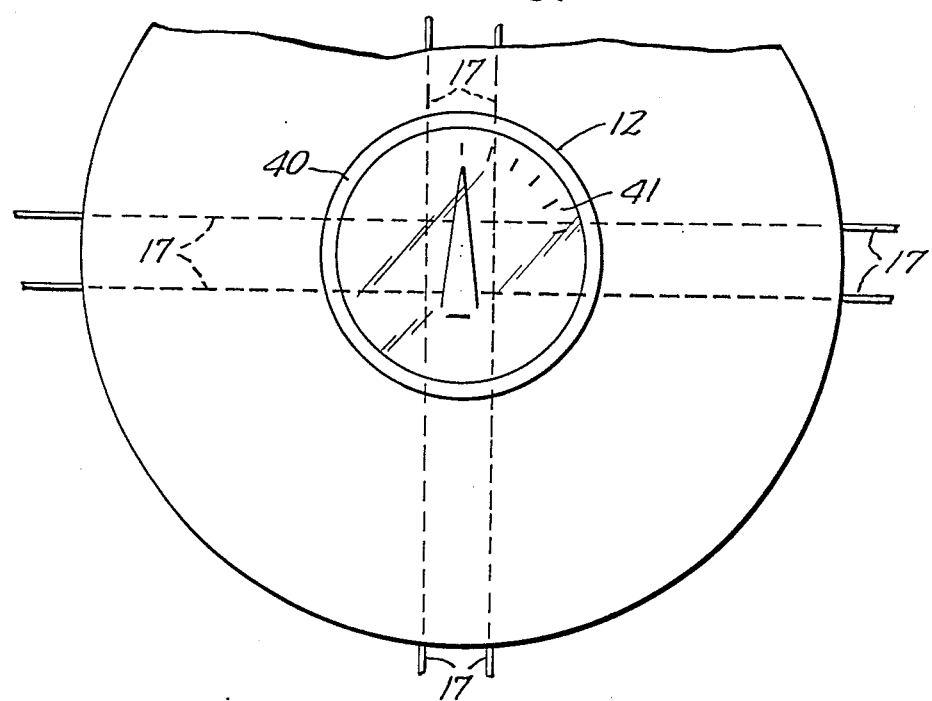
FIG. 3 is a top plan view, somewhat schematic corresponding to the left central portion of FIG. 1.
Figure 17:
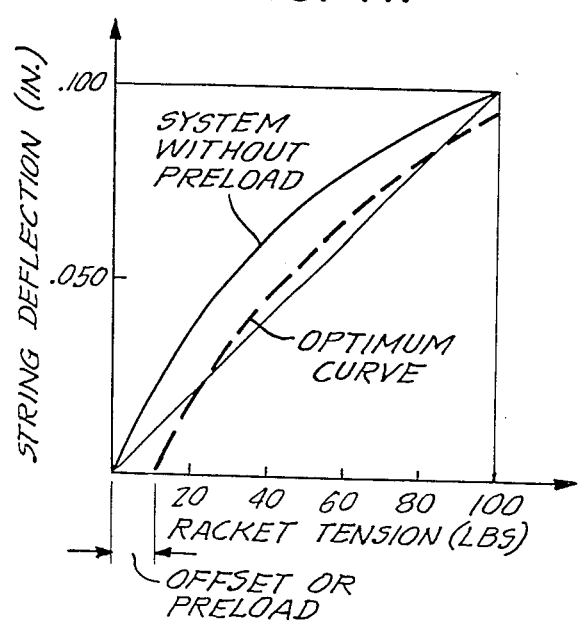
FIG. 17 is a graph showing string deflection normal to the plane of strings against observed spring tension, including predetermined offset.

Operation of the device will be apparent from a consideration of the drawing. With the thumb wheel element 15 in disengaged condition, the main frame element 11 is positioned above a horizontally oriented tennis racket head 16, which results in the threaded shank 56 being projected through a centrally disposed rectangular interstice formed by the centermost segments of strings. This will result in positioning the surface 55 slightly out of the plane 17 of the strings as indicated in FIG. 2. Next the thumb wheel element 15 is engaged with the shank 56 and progressively tightened resulting in the inner surface 60 contacting the strings and moving them to engage the surface 55. The plane of the strings will be deflected to a small degree, and, depending upon the spring modulus of the spring 13, the plunger element 14 will be moved downwardly as seen in FIG. 2 resulting in displacement of the piston 45 and an indication of this displacement by the indicator element 12. In the interest of accuracy, the spring 13 is of relatively low modulus, so that a substantial displacement of the indicating means is obtained with very little lateral displacement of the plane of the strings. Unfortunately, as illustrated in FIG. 17, the force-deflection characteristics for systems of this type tend to be non-linear. An optimum spring rate and a proper spring offset or preload can be calculated to provide the best and most linear resolution in the 20 to 80 pound tension range within which most rackets are strung. Unless this is done, any analog dial will have to be marked in non-linear increments to be read directly in pounds, or marked linearly with reference numbers and related to various rackets and tensions by a graph or chart. By properly sizing the resilient member and its preload, a linear analog dial can be calibrated directly in pounds, and a chart is, therefore, not necessary.

Once a particular testing operation has been completed the thumb wheel element 15 is disengaged, the racket removed from contact therewith, and the thumb wheel element again engaged with the threaded shank 56 to prevent loss of this element.

Turning now to FIG. 4 in the drawing, there is illustrated a second embodiment of the invention offering certain variations over the first embodiment. Principally, the main housing is an elongated beam rather than a hollow cylinder, and is adapted to span the full width of the racket and contact the racket on that portion of certain of the strings which are close to the frame or on the frame thereof. The principal advantage of this construction is that an accurate measurement of string tension may be achieved by a relatively small deflection of the strings over a relatively longer span. In the interests of economy of manufacture, the axial pointer-type dial of the first embodiment is substituted by a dial indicator with a radial plunger. Most importantly, the resilient member is a flat precision steel bar rather than a coil spring. The advantage of using a flat spring is that the spring rate can be accurately controlled by controlling the dimensions of the bar. In the case of a coil spring, the accuracy of tension measurement depends upon the spring rate of the same, and its repeatability from sample to sample. Coil spring rates are commercially available within plus or minus ten percent accuracy. However precision ground bars are readily machined to width and thickness tolerances of plus or minus 0.003 inches, and length tolerances of plus or minus 0.005 inches. This degree of tolerance will yield spring rates accurate to plus or minus one percent.

Referring to FIG. 4 in the drawing, the second embodiment of the invention, generally indicated by reference character 70, is in the form of an elongated two piece casting or molding, including a beam 71 and an integral dial housing 72. The beam 71 is bounded by side surfaces 74 and 75, a lower surface 76 and an upper surface 77. It contains planar recesses 78 which accommodate a deflectable machined steel bar 79 having a central opening 80 extending from an upper surface 81 to a lower surface 82. The opening 80 is aligned with an opening 83 in the beam 71.

Supported within the opening 80 is a stud element 84 having an upper end enlargement 85, a cylindrical shaft portion 86, and a threaded stud portion 87 selectively engageable with a thumb wheel 88. The upper surface of the enlargement 85 is contacted by a radially extending plunger 89 forming part of a radial dial element 90.

As seen in FIG. 4, the device is adapted to span a conventional racket frame 91 and contact that portion of certain of the strings 94 which are close to the frame 91 or the upper peripheral surface 92 thereof. Measurement is accomplished in a manner similar to that employed in the case of the first embodiment, in that the threaded stud portion 87 is inserted through the strings, and the thumb wheel 88 is tightened to bring the strings into contact with the lower surface of the shaft portion 86, causing a deflection of the strings 94. This will cause deflection of the member 79, the extent of which will be measured of forces Fo and Fu between the deflected strings 94 and the deflected beam element 79.

Ideally, the degree of deflection from the normal plane of the strings is about 0.100 inches. Experimentation has indicated that deflections larger than this amount, typically in the order of 0.200 inches, causes the strings to pull through the openings in which they are threaded, and thereby introduced errors in tension reading caused by frictional forces which must be overcome in this process. This slippage will cause an apparent change in tension in the string or strings being deflected. Slippage tends to be less in the case of older wooden racket designs than the more modern synthetic resinous and metallic constructions. FIG. 7 shows frictional force f acting on strings 94 causing a difference in tension between points $B_1$ and $B_2$.

Because of the very large number of rackets presently on the market, and because of the large variety of shapes, it may be necessary to mark the dial indicator face with numbers and provide a chart to relate numbers to tension. We have found that accuracy of reading may be improved by the use of a device shown in FIG. 8 which serves to stabilize and align the strings prior to measuring tension. This process contemplates the straightening of the strings so that they extend at two right angles with respect to strings with which they intersect. The device shown in FIG. 8 and indicated by reference character 96 is simply a flat plate faced with a multiplicity of paramidal shapes 97, FIG. 9. By pushing the pyramids into the string openings, the strings will be aligned or stabilized in the desired configuration.

Figure 11:
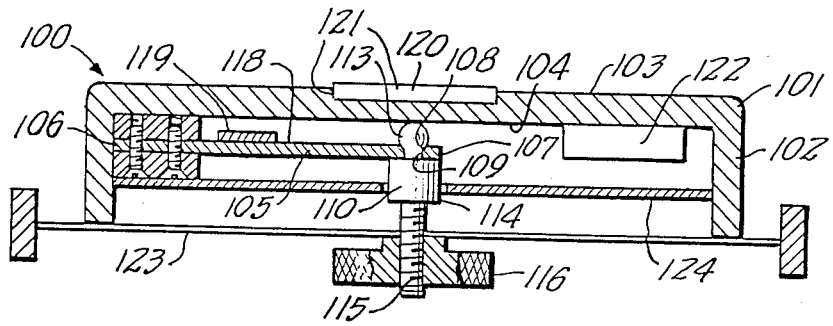
FIG. 11 is a transverse sectional view corresponding to FIG. 2, but showing a second embodiment of the invention.
Figure 13:
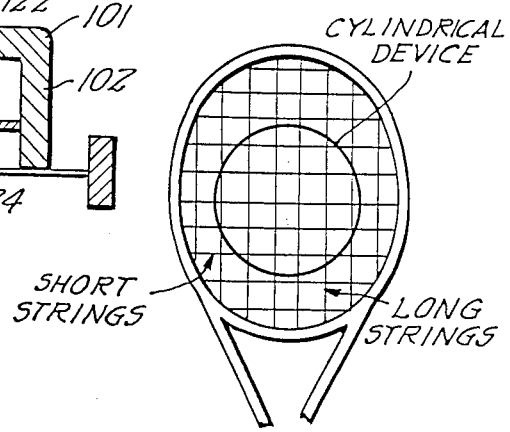
FIG. 13 is a schematic view showing the positioning of the structure of FIG. 11 on a tennis racket.
Figure 12:
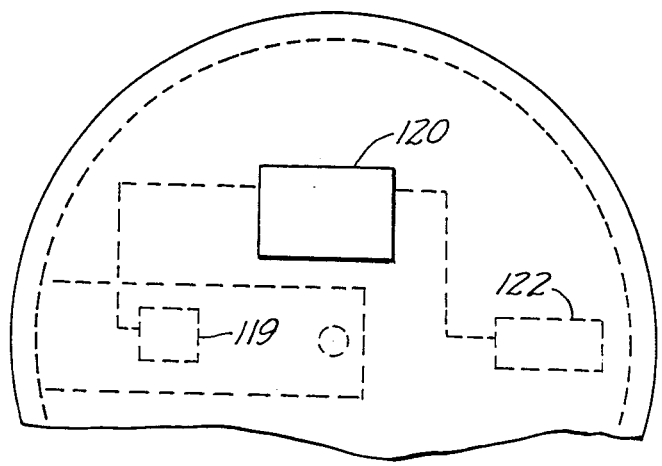
FIG. 12 is a transverse sectional view as seen from plane 12—12 in FIG. 11.
Figure 14:
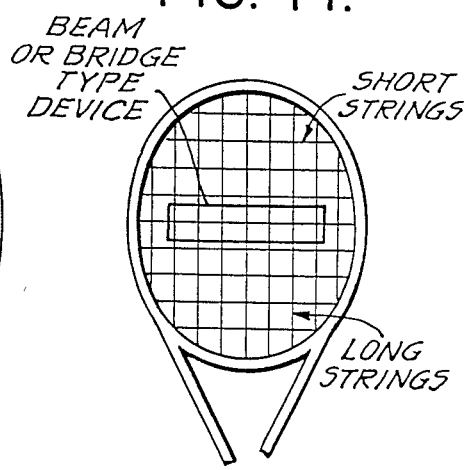
FIG. 14 is a similar schematic view showing the positioning of the structure of FIG. 4 on a tennis racket.
Figure 15:
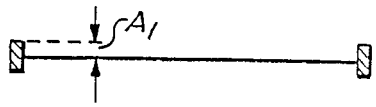
FIGS. 15 and 16 schematically illustrate differences in racket thickness in the areas supporting the strings necessitating compensation in the form of offsets in readout structure.
Figure 16:
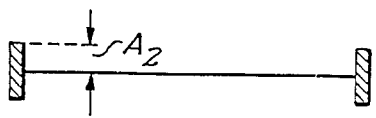

Turning now to the third embodiment, illustrated in FIGS. 11 and 12 in the drawing, there is illustrated a further refinement. This embodiment is of generally cylindrical configuration and is used as shown in FIG. 13, as contrasted with the second embodiment which is used in a manner shown in FIG. 14 in the drawing. It has a further advantage in that it is adapted to contact the strings of the racket without contacting the frame, so that differences in frame thickness as illustrated by a comparison of FIGS. 15 and 16 of the drawing, do not require consideration. The principal advantage of the cylindrical design is that it causes both short and long strings to respond with the same force deflection characteristics.

The third embodiment of the invention differs from the first and second embodiments in that it incorporates a digital read out. The read out is governed by a strain gauge of known type which is bonded to the resilient element which is of cantilever type. Where necessary, or desirable, it is also possible to electronically program out system non-linearities and program in rack variations.

The third embodiment, generally indicated by reference character 100, comprises a cylindrical housing 101 including a peripheral wall 102, an upper planar wall 103, a lower planar wall 104, a lower planar cover 124, and a resilient member 105 in the form of a cantilevered steel bar. A first end 106 of the bar is anchored, while a second free end 107 is provided with a recess 108 and through opening 109 for a stud element 110. The stud element 110 includes an upper enlargement 113, a cylindrical shaft portion 114 and a lower threaded stud portion 115 engaging the thumb wheel 116.

The resilient member 105 has mounted on an upper surface 118 thereof, a conventional strain gauge 119 connected to a digital read out 120 positioned within a recess 121 in the upper wall 103. To permit ready portability, a dry cell power source 122 is employed.

Measurement is accomplished in a manner similar to that employed in the case of the first embodiment, in that the threaded stud portion 115 is inserted through the strings, and the thumb wheel 116 is tightened to bring the strings into contact with the lower surface of the shaft portion 110, causing a deflection of the strings 123. This will cause deflection of the member 118, the extent of which will be measured by the strain gauge 119 and be electronically converted to a tension reading and displayed on digital read out 120.

We wish it to be understood that we do not consider the invention limited to the precise details of structure shown and set forth in this specification, for obvious modifications will occur to those skilled in the art to which the invention pertains.

We claim:

1. An improved tennis racket string tension tester comprising: a main frame element having a transversely extending main wall, and a lateral cylindrical body adapted to contact the strings of a tennis racket head, said main wall having a centrally disposed bore therethrough extending between outer and inner surfaces thereof; said main wall having a counterbore therein defining a circular shoulder, and a planar retaining plate having a central opening therein overlying said counterbore; tension indicating means mounted upon said main wall and having an actuating member extending through said bore; a plunger element including a generally main body slidably positioned within said counterbore and having a first end surface thereby contacting said actuating member for the transmission of motion thereto; resilient means surrounding said main body tending to urge said body against said actuating member; said body having an oppositely disposed second ends surface thereon, a threaded shank extending axially from said second end surface; and a thumb wheel element having a centrally disposed threaded bore selectively engaging said threaded shank; whereby, upon the engagement of said main frame element with the strings of the racket, said threaded shank is projected through a centrally located square interstice in the strings of the racket to position said second end surface laterally of the plane of said strings, and engagement of said thumb wheel element with said threaded shank serves to move a centrally disposed segment of said strings defining said square interstice laterally of the plane of said strings to compress the same against said second end surface of said plunger element to result in axial displacement of said plunger element toward said plane of said strings against the action of said resilient means, the degree of displacement being thereby measured by said tension indicating means in terms of the spring modulus of said resilient element.

2. A tennis racket string tension tester in accordance with claim 1, further characterized in said main frame element being free of contact with the strings of a racket during use, thereby eliminating any frictional forces which might affect the measured degree of tension.

3. An improved tennis racket string tension tester comprising: a main frame element having a lower surface adapted to contact the strings of a tennis racket on a first side thereof, a resilient element carried by said main frame element having indicator means and a elongated plunger element communicating with said indicator means, said plunger element having a principal axis, and a radially oriented cylindrical member extending outwardly of said main frame element, said cylindrical member having a transversely extending string-engaging surface at an outer end thereof; a threaded shank carried by said cylindrical member and adapted to be projected through an interstice in the strings of a racket being tested, a thumb wheel threadedly engageable upon said threaded shank and serving to contact said strings on a second side thereof to urge the same out of the normal plane a predetermined distance into contact with said transversely extending surface; and resilient element of predetermined spring modulus connected to said plunger element and movable therewith in response to the applied tension of said strings, for measuring the degree of movement of said stud element in terms of observed string tension.

4. A string tension tester in accordance with claim 3, further characterized in said resilient element being in the form of a coil spring axially aligned with said plunger element.

5. A string tension tester in accordance with claim 3, further characterized in said resilient element being in the form of a flat bar lying in a plane perpendicular to the axis of said plunger element.

6. A string tension tester in accordance with claim 5, further characterized in said resilient element being in cantilevered relation relative to said main frame element, and including a first end connected to said main frame element, and a second end connected to said plunger element.

7. A string tension tester in accordance with claim 6, further characterized in said resilient element having an electronic strain gauge secured to a surface thereof, and digital read out means carried by said main frame element receiving the output of said strain gauge.

* * * * *